E. W. RUTAN.
Tire-Tighteners.
No. 155,677. Patented Oct. 6, 1874.
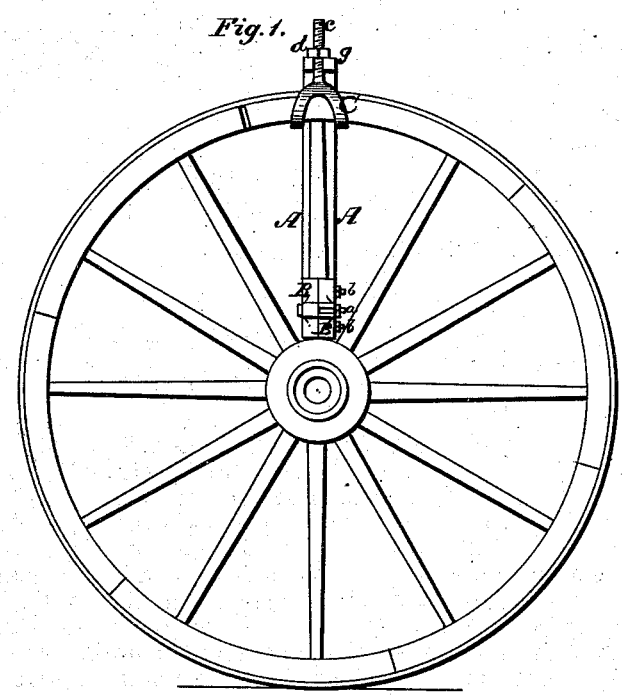
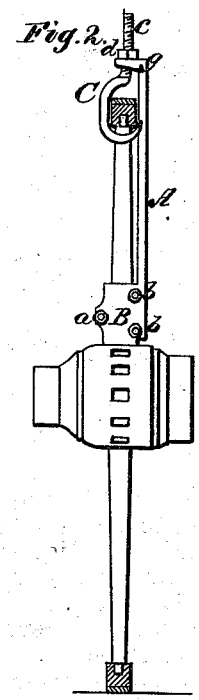
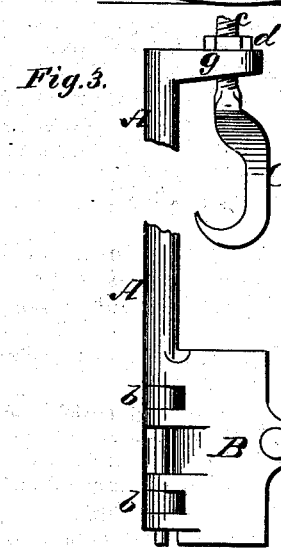
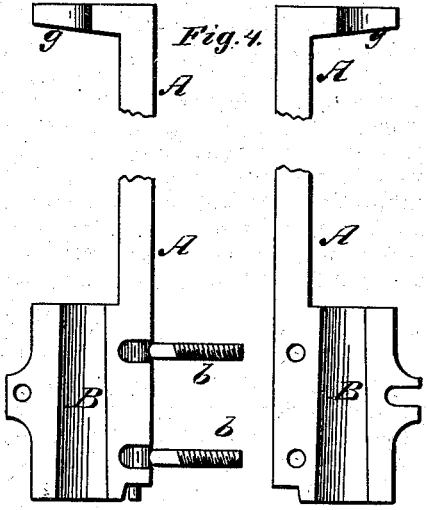
Witnesses:
H. C. Hollingshead
E. H. Bates
Inventor:
Enos W. Rutan,
Chipman Hosmer & Co
Attorneys

UNITED STATES PATENT OFFICE.

ENOS W. RUTAN, OF ELMIRA, NEW YORK.

IMPROVEMENT IN TIRE-TIGHTENERS.

Specification forming part of Letters Patent No. 155,677, dated October 6, 1874; application filed September 6, 1874.

*To all whom it may concern:*

Be it known that I, ENOS W. RUTAN, of Elmira, in the county of Chemung and State of New York, have invented a new and valuable Improvement in Tire-Tighteners; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my tire-tightener. Fig. 2 is an end view, and Figs. 3 and 4 are detail views, of the same.

This invention has relation to devices for tightening tires on wheels without cutting or shrinking the tires, and by simply expanding the wheels. It consists in a clamping-stock for the spokes, in combination with a claw for the fellies, which claw is constructed with a screw-shank having a nut on it, by which the wheels are expanded, as will be hereinafter explained.

The following is a description of my improved tire-tightener.

In the accompanying drawings, A A designate the two bars, which constitute the stock of the tightener. These bars have jaws B B formed on their ends, which jaws are connected together by hinges, and designed for embracing spokes of various sizes, and to be firmly clamped thereon by means of screws and nuts *a b b*. The hinge for the jaws B B is formed by means of a pin, *p*, passed through eyes on the ends of screws *b b*. The opposite ends of the bars A A have a slotted portion, *g*, formed on them at right angles, the slot in which is intended to receive the screw-threaded shank *c* of a claw, C. This claw consists of two hooking portions formed on the shank *c*, and separated to admit a spoke between them. When the stock is firmly clamped on a spoke in a wheel, as shown in Figs. 1 and 2, the claw C is adjusted on the felly, with its shank in the slotted portion *g*. A nut, *d*, is then applied on the shank *c*, and screwed down upon the portion *g*; then by continuing to turn the nut, by means of a good wrench, the claw C will draw on the felly and expand the same tightly against the tire. While the strain is on the felly I insert a leather washer, or some other substance, in the space between the shoulder of the spoke and the felly, thus keeping the strain on the felly to the tire, and preventing any friction between the spoke and felly.

Devices for clamping the spoke and forcing the fellies outward, by means of an arm screw-thread and following nut, have heretofore been used.

What I claim as new, and desire to secure by Letters Patent, is—

The bars A A, having hinged jaws B B and a slotted portion, *g*, formed on them, in combination with clamping nuts and bolts *a b b*, and the claw C with its screw-shank *c* and nut *d*, substantially as described.

In testimony that I claim the above I have hereunto subscribed my name in the presence of two witnesses.

ENOS W. RUTAN.

Witnesses:
SEYMOUR DEXTER,
ROBT. T. TURNER.